US010253627B2

(12) United States Patent
Warren

(10) Patent No.: US 10,253,627 B2
(45) Date of Patent: Apr. 9, 2019

(54) METHOD OF REPAIRING A TUNNEL

(71) Applicant: Warren Environmental, Inc., Carver, MA (US)

(72) Inventor: Danny Warren, Carver, MA (US)

(73) Assignee: WARREN ENVIRONMENTAL & COATING, LLC, Middleborough, MA (US)

( * ) Notice: Subject to any disclaimer, the term of this patent is extended or adjusted under 35 U.S.C. 154(b) by 0 days.

(21) Appl. No.: 15/941,508

(22) Filed: Mar. 30, 2018

(65) Prior Publication Data

US 2018/0283174 A1 Oct. 4, 2018

Related U.S. Application Data

(60) Provisional application No. 62/479,869, filed on Mar. 31, 2017.

(51) Int. Cl.
*E21D 11/40* (2006.01)
(52) U.S. Cl.
CPC .................................. *E21D 11/40* (2013.01)
(58) Field of Classification Search
CPC combination set(s) only.
See application file for complete search history.

(56) References Cited

U.S. PATENT DOCUMENTS

| 4,379,654 | A | * | 4/1983 | Rovelli | E21D 11/381 |
| | | | | | 405/53 |
| 4,625,631 | A | * | 12/1986 | Vera | E21F 1/04 |
| | | | | | 104/182 |
| 5,452,853 | A | * | 9/1995 | Shook | B05B 13/0636 |
| | | | | | 118/317 |
| 10,030,486 | B1 | * | 7/2018 | Keller | E21B 43/103 |
| 2007/0202286 | A1 | * | 8/2007 | Jacobs | D07B 1/141 |
| | | | | | 428/36.3 |
| 2013/0343822 | A1 | * | 12/2013 | Swarny | E21D 5/00 |
| | | | | | 405/150.2 |

* cited by examiner

*Primary Examiner* — Kyle Armstrong
(74) *Attorney, Agent, or Firm* — Barlow, Josephs & Holmes, Ltd.

(57) ABSTRACT

A method for repairing in-ground tunnel structures including the steps of: a) cleaning the structure to be lined; b) installing a suspension cable along the top of the tunnel; c) suspending sheets of liner composite along the suspension cable; d) applying resin to one side of the tunnel; e) bedding the liner composite into the applied resin; f) removing suspension cable once the top edge of the resin and liner composite becomes self-supporting; g) applying resin to the other side of the tunnel; and h) bedding the liner composite into the resin. The process can then be repeated along the length of the tunnel in a sheet by sheet fashion.

8 Claims, 5 Drawing Sheets

METHOD OF REPAIRING A TUNNEL

CROSS-REFERENCE TO RELATED APPLICATIONS

This application is related to and claims priority from earlier filed US Provisional Patent Application No. 62/479,869, filed Mar. 31, 2017.

BACKGROUND OF THE INVENTION

The present invention generally relates to a method for repairing an in-ground tunnel structure. More particularly, the method involves suspending dry sheets of repair composite along the tunnel after the walls have been cleaned, applying a resin material to the walls and bedding the repair composite into the resin. The resulting composite tunnel structure has high mechanical strength and is resistant to water leaks.

There are numerous tunnel structures that run underground throughout the world. Railroad tracks, subway tracks, communication cables, electrical lines, and other equipment are laid in such tunnels. In many instances, the tunnels are built in rocky areas. Dynamite and other explosives are used to blast the rock-lined subterranean layers and clear an underground area for building the tunnel. The tunnel structure may be made from a wide variety of materials including rocks, steel, sheet metal, concrete blocks, and bricks. The tunnel structure includes archways, interior walls, and ground platform sections. If concrete blocks or bricks are used to fabricate the tunnel structure, these materials typically are held together by cement, mortar, or other bonding agents. In addition, the interior walls of the tunnel typically are lined with a cementitious liner. The cementitious liner can be produced by applying a cement mixture over the interior walls and smoothing-out the mixture to form a uniform cementitious layer. The cementitious layer provides a smooth and hard lining for the interior surface of the tunnel. Moreover, the cementitious liner helps to seal the interior walls and prevent fluids from leaking into the passageway of the tunnel.

However, over a period of time, the tunnel tends to deteriorate due to ordinary aging, corrosive action of fluids being transported in the tunnel, unusual environmental conditions, and other reasons. Cracks, holes, and other defects may develop in the walls of the tunnel. If the wall structure of the tunnel decays substantially, then ground water may seep or flow freely through the tunnel walls. The penetration of the ground water into the tunnel passageway may cause hazardous conditions.

For example, in cold climates, the seeping water may freeze and form icebergs, icicles, and other icy buildup. If the icy buildup comes into contact with a high voltage line (for example, a line having 13, 200 volts), the line can ground out. This can lead to fire, explosions, and other hazardous conditions. Any electrical lines or communication cables that are running through the tunnel can be damaged or destroyed.

There are various known methods for rehabilitating existing underground tunnel structures. One method involves coating an inner layer with a tightly sealing material such as plastic, steel, or concrete fibers. An intermediate layer comprising a steel-reinforced, water-tight, concrete composition is sprayed over the inner layer. An outer layer comprising a concrete mixture of haydite, sand, cement, swelling agents, and water-conducting fibers is sprayed over the intermediate layer. The outer layer is water-permeable and used for conducting the ground water.

Another method provides for sheets of material to be unrolled and cut in situ and applied to the inner wall surfaces. Holes are cut into the walls through the sheets and anchors are attached to the walls. The sheets are waterproof and fireproof, provide good thermal insulation properties, have tear-resistance and moisture-resistance features, and are heat-sealable.

Similarly, another tunnel liner system comprises a combination of prefabricated modular wall panels and arch panels that conform with the dimensions and clearance requirements of the tunnel. The liner panels are joined together by cam-lock fasteners. A lightweight, chemically-hardening structural fill composition can be injected in the voids located between the rock face of the tunnel and liner panels. The structural fill composition can include a mixture of polystyrene beads, wetting agents, organic fibers, Portland cement, and sand.

One method involves cutting T-shaped grooves into the brick lining. One or more reinforcement rods, which are encased in a fabric sleeve, are inserted through the narrow mouth of each groove (the stem region of the "T") so that they rest within the enlarged part of the groove (the cross-bar region of the "T"). Grout is injected into the fabric sleeve so that it expands against the groove, and some grout seeps through the sleeve to bond to the brick lining. Anchoring holes may be drilled through the brick lining and into the surrounding rock. Expansion bolts are inserted into the anchoring holes and secured to the ends of the reinforcement rods.

Although the above-described conventional methods of lining tunnel structures with fabricated sheets and panels can be effective somewhat in rehabilitating such structures, these repair methods can be cumbersome and time-consuming. For instance, the modular sheets and panels must be fitted carefully inside of the tunnel so that they conform tightly to the archways and wall sections. After this fitting step has been completed, the sheets and panels must be fastened in place by anchors, bolts, and the like. Furthermore, the modular liner sheets and panels and other materials used in these conventional repair systems can be costly.

There is a need for an improved method for repairing in-ground tunnel structures that does not involve installing sheets, panels, and other mechanical supports in the tunnel. The method should be relatively quick and practical so that it can be used on a wide variety of tunnel structures. The method should also be economically feasible.

There is a further need for a method whereby a first curable resin is applied to the interior wall surfaces of the tunnel and a sheet of composite material, suspended within the tunnel is pressed into the resin on the wall structure of the tunnel. The resins are allowed to cure and harden, thereby sealing the wall surfaces and drainage holes. The resulting composite tunnel structure has high mechanical integrity and is resistant to water leaks. These and other objects, features, and advantages of this invention are evident from the following description and attached figures.

BRIEF SUMMARY OF THE INVENTION

In this regard, the present invention relates to a method for repairing in-ground tunnel structures. The tunnels have an interior wall surface that is lined with an existing cementitious, brick or tile liner. The method comprises the steps of: a) cleaning the structure to be lined; b) installing a suspension cable along the top of the tunnel; c) suspending sheets of liner composite along the suspension cable; d) applying resin to one side of the tunnel; e) bedding the liner composite into the applied resin; f) removing suspension cable once the top edge of the resin and liner composite becomes self-supporting; g) applying resin to the other side of the tunnel; and h) bedding the liner composite into the resin.

The present invention provides a method for repairing damaged tunnel structures. First, in accordance with this invention, the cementitious liner, which lines the inside wall surfaces of the tunnel, is cleaned. After the surface cleaning and preparation step has been completed, any standing water left in the bottom portion of the tunnel passageway is removed.

In a subsequent step a suspension cable is installed along the longitudinal length of the tunnel at a position at or near the top of the tunnel. Once the suspension cable is in position sheets of dry liner composite material are draped over the suspension cable.

Spray application equipment is then preferably used to apply a curable resin material to the wall surface of the tunnel and one side of the composite liner is pressed into the applied resin so that the composite is fully wet out and bedded into the resin and the air is purged from behind the composite.

The remaining wall surface of the tunnel is then coated with a curable resin and the remaining half of the liner is pressed against the opposing side of the tunnel to complete the lining process for that sheet of lining composite. The process can then be repeated along the length of the tunnel in a sheet by sheet fashion.

Therefore, it is an object of the present invention to provide an improved method for repairing in-ground tunnel structures that does not involve installing sheets, panels, and other mechanical supports in the tunnel. It is a further object of the present invention to provide a method whereby a first curable resin is applied to the interior wall surfaces of the tunnel and a sheet of composite material, suspended within the tunnel is pressed into the resin on the wall structure of the tunnel. The resins are allowed to cure and harden, thereby sealing the wall surfaces and drainage holes. The resulting composite tunnel structure has high mechanical integrity and is resistant to water leaks. These and other objects, features, and advantages of this invention are evident from the following description and attached figures.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Disclosed herein is a method for repairing in-ground tunnel structures. The tunnels have an interior wall surface that is lined with an existing cementitious, brick or tile liner. The method comprises the steps of: a) cleaning the structure to be lined; b) installing a suspension cable along the top of the tunnel; c) suspending sheets of liner composite along the suspension cable; d) applying resin to one side of the tunnel; e) bedding the liner composite into the applied resin; f) removing suspension cable once the top edge of the resin and liner composite becomes self-supporting; g) applying resin to the other side of the tunnel; and h) bedding the liner composite into the resin.

The method of the present invention relates to repairing in-ground tunnel structures. By the term, "tunnel structure" as used herein, it is meant any hollow conduit. For instance, the method can be used to repair in-ground, channeled structures that house railroad tracks, subway tracks, communication cables, electrical lines, and the like. In addition, the method can be used to repair in-ground pipelines such as water lines, sewer pipes, storm water drains, and the like.

Figure 1:
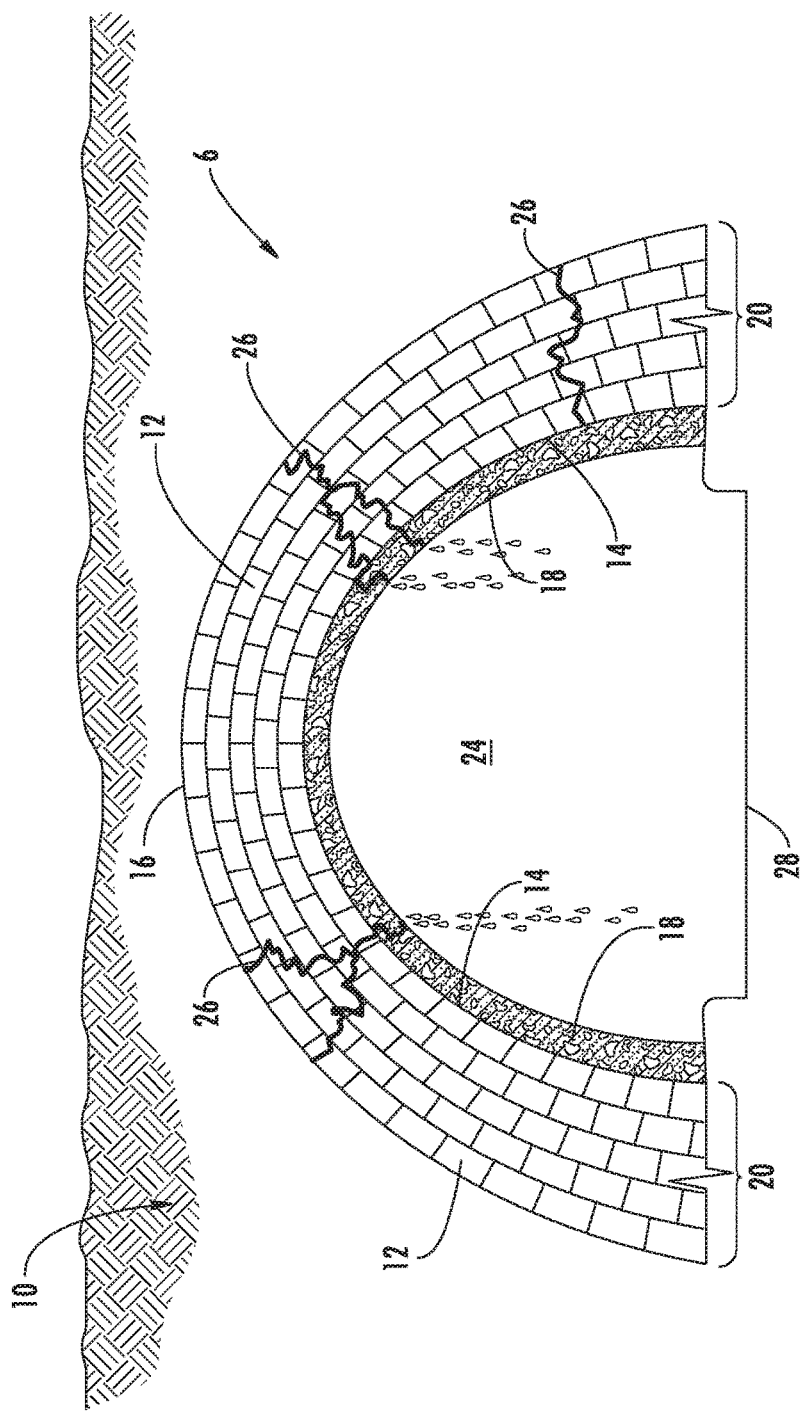
FIG. 1 is a cross-sectional view of a tunnel requiring repair.

Referring to FIG. 1, a vertical cross-section view of a typical tunnel structure is shown. The tunnel is generally indicated at 6, and the tunnel 6 is installed in a ground area generally indicated at 10. The tunnel 6 can be made of concrete blocks or bricks 12 that are held together by mortar or other suitable adhesive materials. The tunnel 6 in FIG. 1 is shown as being constructed from concrete blocks or bricks 12 for illustration purposes only, and it should be recognized that the tunnel 6 can be made from a wide variety of materials including rocks, steel, and sheet metal as discussed above. In FIG. 1, the tunnel structure 6 includes interior wall portions 14 and exterior wall portions 16. A relatively thick cementitious composition 18 lines the interior wall portions 14. This cementitious lining 18 is designed to seal the tunnel wall structure 20 and prevent fluids from leaking into the tunnel passageway 24. The cementitious liner 18 further helps strengthen and maintain the structural integrity of the tunnel wall structure 20. Such cementitious liners 18 are commonly used to line the interior wall surfaces 14 of the tunnels 6. The cementitious liner 18 is prepared ordinarily by coating a cement mixture over the interior wall surfaces 14 so that it forms a uniformly coated layer. Such cement mixtures are known in the industry. The cement mixture may contain Portland cement, lime, alumina, silica, reinforcing fibers, and various additives as is known in the art.

Despite the cementitious liner 18, the structure of the tunnel 6 tends to decay and deteriorate over a period of time. This deterioration can be due to a variety of reasons such as ordinary aging or changing environmental conditions as discussed above. For example, the cementitious liner 18 is often exposed to freezing and thawing conditions. As the liner 18 contracts and expands, it can spall. The fragmentary pieces and chips of the liner 18, which break-off during the spalling, lead to further deterioration of the tunnel structure. Also, soil, chemicals, and other foreign debris tend to accumulate on the cementitious liner 18 over the lifetime of the tunnel 6. This foreign material forms hard scale deposits that can further corrode the liner structure 18. In addition, the concrete blocks or bricks 12, which constitute the wall structure 20, are held together by a cement mortar or other adhesive. But, pores and voids can form eventually in the mortar. These porous defects can lead to a decrease in the strength and adhesive properties of the mortar. As the adhesive bonds between the concrete blocks or bricks 12 in the tunnel structure 6 weaken, fragmentary pieces of the blocks and bricks 12 can break-off.

As the overall tunnel structure 6 continues to deteriorate, fissures and larger cracks 26 can develop in the walls 20 of the tunnel 6 and penetrate through the cementitious liner 18. As these cracks form and propagate throughout the wall structure 20, water from the surrounding ground areas 10 will penetrate into the walls. This seeping and infiltration of the ground water further corrodes the wall structure 20. As the ground water leaks through the wall structure 20, it may collect and pool at the bottom region 28 of the tunnel 6. Also, as discussed above, in cold conditions, the leaking ground water may freeze and ice may build up. If the icy buildup comes into contact with a high voltage line in the tunnel 6, the line can ground out leading to fire, explosions, and other hazardous conditions. Any electrical lines or communication cables running through the tunnel 6 can be damaged or destroyed.

The present invention provides a method for repairing such damaged tunnel structures 6. First, in accordance with this invention, the cementitious liner 18, which lines the inside wall surfaces 14 of the tunnel 6, is cleaned.

This cleaning step is important, because it allows a curable resin, such as an epoxy, that is applied subsequently to the cementitious liner 18 to bond tightly to the liner 18. The application and bonding of the curable resin to the cementitious liner 18 is described in further detail below.

Preferably, the cementitious liner 18 is cleaned by injecting highly pressurized water onto the liner 18. Known power-washing devices can be used to apply the pressurized water. The water is generally sprayed at a pressure in the range of about 4,000 to about 20,000 pounds per square inch (psi) to effectively clean the surfaces of the liner 18, but it is understood that the pressure of the water is not restricted to this range, and the water may be applied at any appropriate compressive strength. The pressurized water stream scrubs the cementitious liner 18 forcefully to remove debris and produce a clean, smooth surface. Highly-pressurized water is used preferably to clean the cementitious liner 18. But, it is recognized that other cleaning media such as compressed air or steam may be employed as well.

In addition, chemical cleaners such as detergents may be used to thoroughly clean the cementitious liner 18 if needed. But, the use of such chemical cleaners is not recommended, because they may interfere with the application of the epoxy or other resin. If such chemical detergents are used, then the cementitious liner 18 should be treated subsequently with clean water to remove any chemical residue.

After this surface cleaning and preparation step has been completed, any standing water left in the bottom portion 28 of the tunnel passageway 24 is removed. In one embodiment, highly-pressurized air can be injected into the passageway 24 to clear the standing water. In other embodiment, the standing water is allowed to flow naturally into drains (not shown) located at the bottom portion 28 of the tunnel passageway 24.

Figure 2:
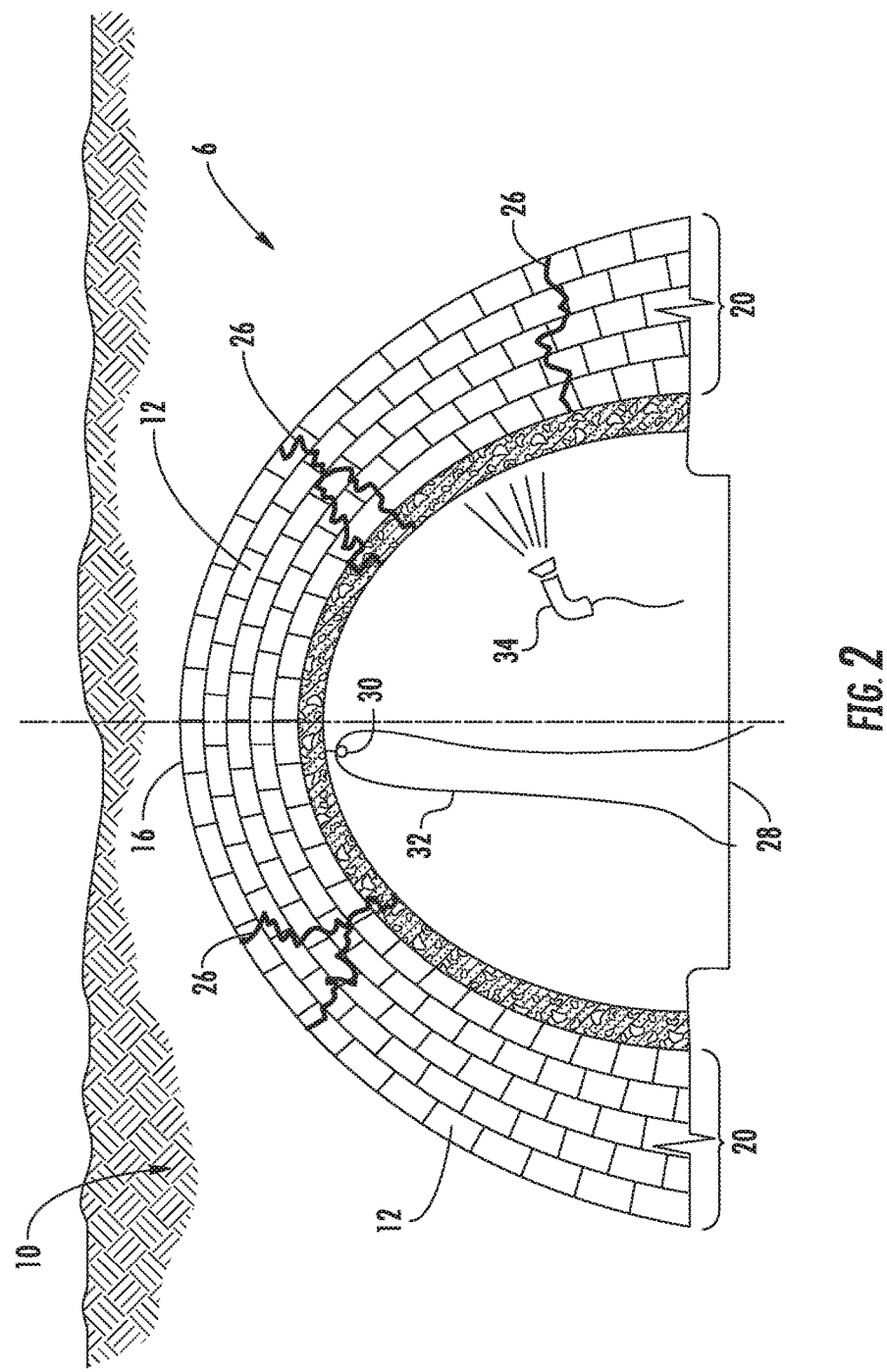
FIG. 2 is a cross-sectional view of the tunnel of FIG. 1 showing an illustrative step of the present invention.

Turning to FIG. 2, a suspension cable 30 is installed along the longitudinal length of the tunnel at a position at or near the top of the tunnel. The exact location is not critical simply that the suspension cable is positioned proximate the top center of the tunnel. Certainly, variations in this position are not critical to the invention and are considered to fall in the scope of the invention. Once the suspension cable 30 is in position sheets of dry liner composite material 32 is draped over the suspension cable. It is preferred that the composite sheets 32 are of a length that will extend fully across the interior surface of the tunnel when applied thereto.

Figure 3:
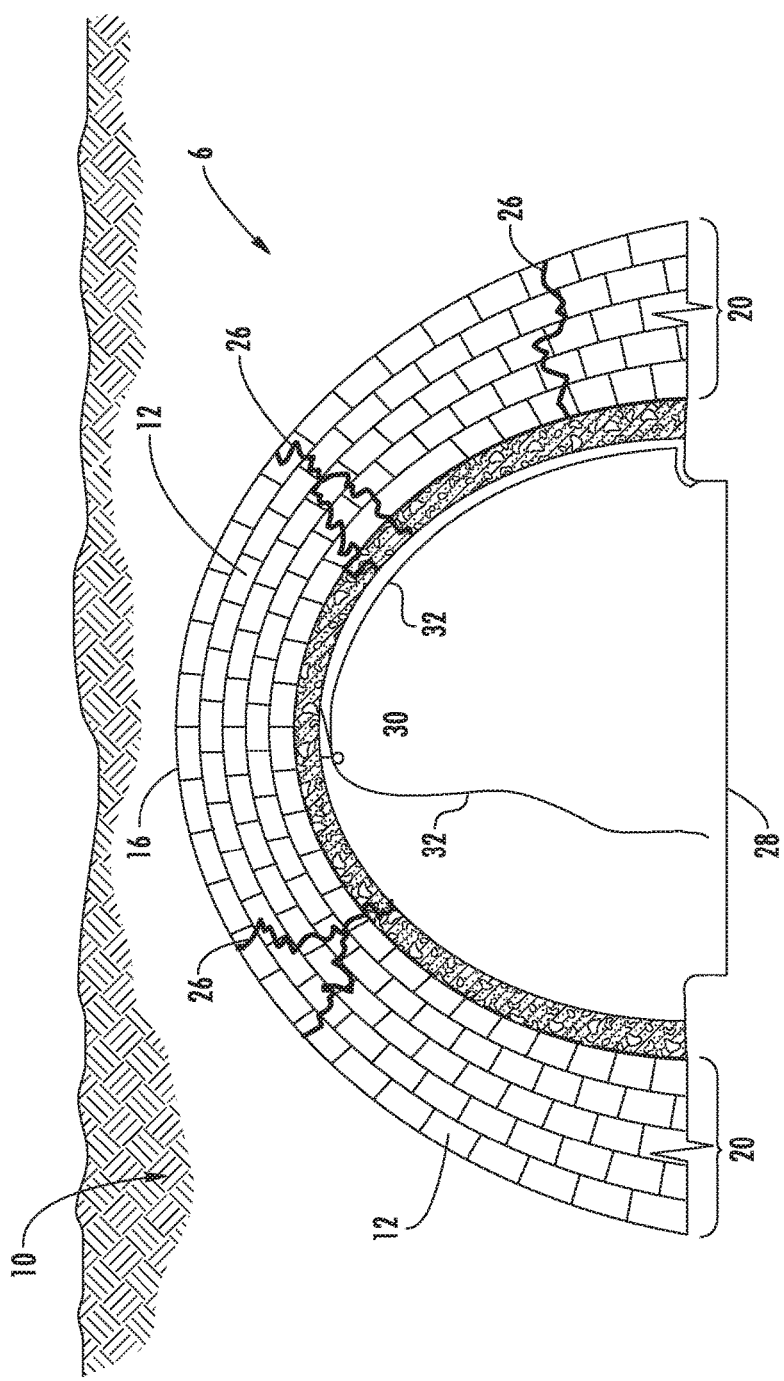
FIG. 3 is a cross-sectional view of the tunnel of FIG. 1 showing another illustrative step of the present invention.

Spray application equipment 34 is then preferably used to apply a curable resin material to the wall surface of the tunnel. Similarly, the material can be brushed or rolled as the particular installation requires. Turning to FIG. 3, one side of the composite liner 32 is pressed into the applied resin. It is brushed or rolled into the resin so that the composite is fully wet out and bedded into the resin and the air is purged from behind the composite.

Figure 4:
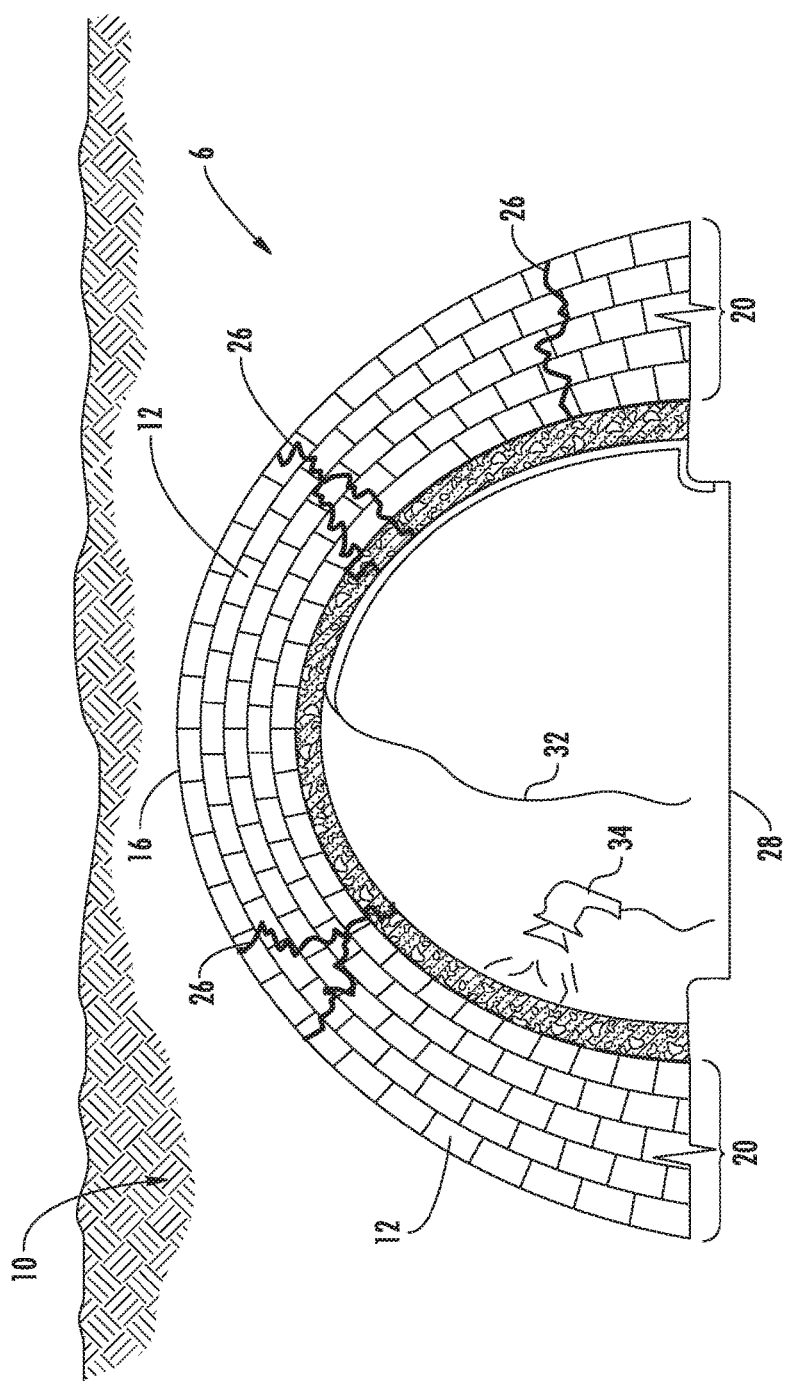
FIG. 4 is a cross-sectional view of the tunnel of FIG. 1 showing another illustrative step of the present invention.

Turning now to FIG. 4 the support cable can be seen as being removed and resin is applied to the remaining side of the tunnel. It should be appreciated that the cable removal is shown first, this makes application and smoothing of the liner easier. However, one can appreciate that the cable can remain in place until the liner is applied to both sides of the tunnel as well.

Figure 5:
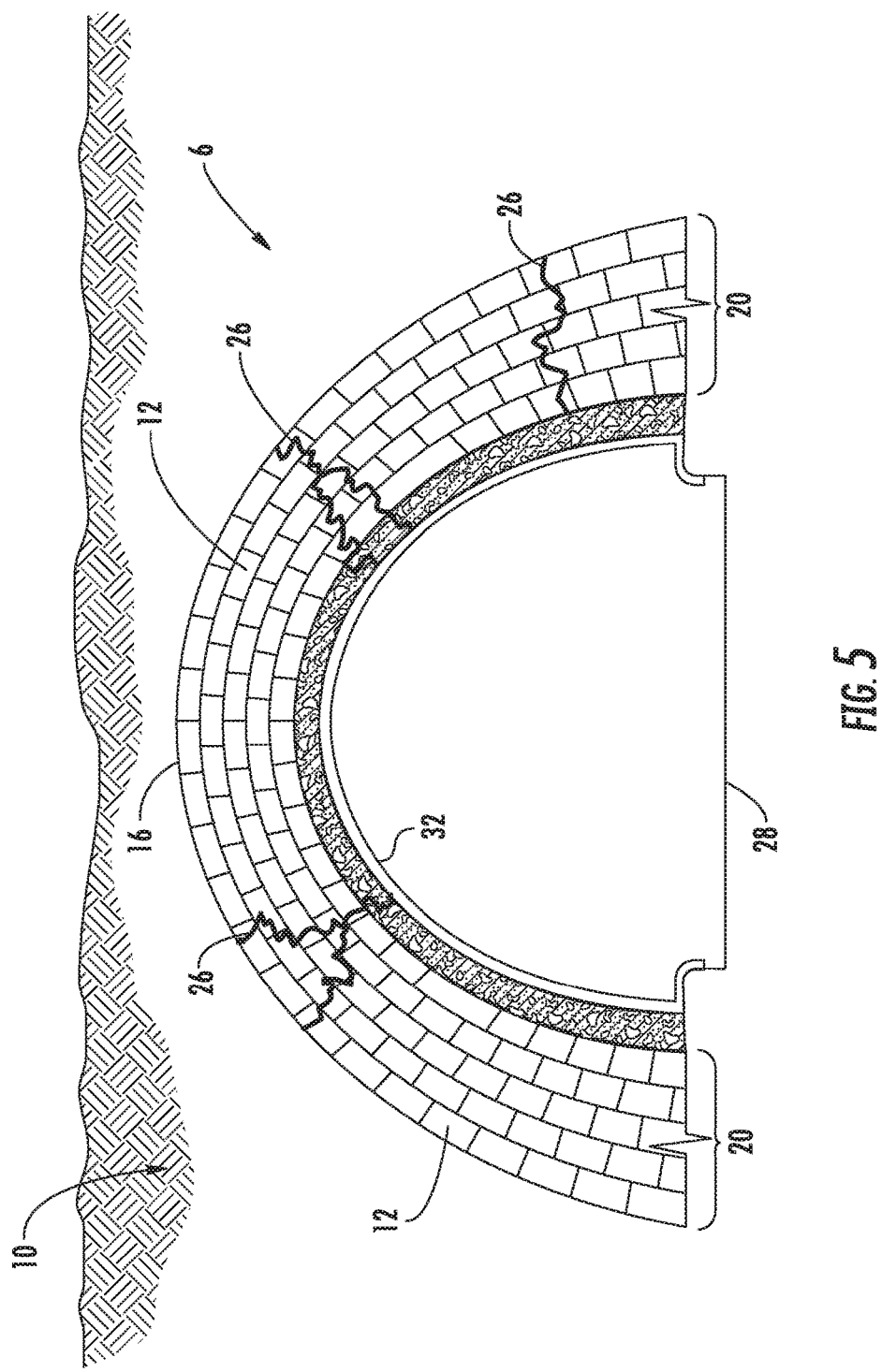
FIG. 5 is a cross-sectional view of the tunnel of FIG. 1 showing the completed repair of the present invention.

Turning to FIG. 5, the remaining half of the liner 32 is pressed against the opposing side of the tunnel to complete the lining process for that sheet of lining composite. The process can then be repeated along the length of the tunnel in a sheet by sheet fashion.

A curable resin material such as an epoxy, is the preferred material for application and bedding of the composite liner sheet. The resin is applied in a generally uncured, liquid form and then allowed to cure and harden. The resin is applied in a heated state. The temperature of the resin is typically in the range of about 140° F. to about 180° F. The heated resin cures in a relatively short period of time.

The resin can be applied onto the cementitious liner 18 using any suitable application technique. Preferably, the resin is sprayed onto the cementitious liner using a spray application system. The spray applicator delivers the two-parts at a temperature that promotes their spray application as well as their self-setting reaction. It is also recognized that other spray applicators can be used to apply the resin over the cementitious liner 18 in accordance with the method of this invention. The resin is applied so that it forms a uniform, smooth resinous coating that overlays the cementitious liner 18. The resin may be applied at any suitable thickness. Normally, the resin is applied at a thickness in the range of about one-quarter (¼) to about two (2) inches, and preferably the resin is coated over the cementitious liner 18 uniformly at a thickness of about ¼ inches.

Many different types of curable resins can be used for producing the coating that overlays the cementitious liner 18, in accordance with the method of this invention. The curable resin should have high bond and mechanical strength properties. Particularly, the resin should have high compressive, tensile, and flex strength properties. For example, polyesters; vinyl esters such as urethane-based vinyl esters; and bisphenol A-fumarate based vinyl esters; and epoxy resins can be used. Epoxy resins are particularly preferred because of their strong bonding and mechanical properties. The epoxy resin should be capable of being applied to wet surfaces and have good water-resistant properties.

The liner may be woven or non-woven glass reinforced fiber sheets or mats. Further the liner sheets could be carbon fiber or other suitable composites. The epoxy resin may be self-curing or forced to cure by applying heat. As the epoxy resin cures and hardens, the reinforcing material bonds to the expansion joints to form a reinforced structural area. The resulting composite structure has high mechanical strength and integrity. All such modifications and changes to the illustrated embodiments herein are intended to be covered by the appended claims.

Various other components may be included and called upon for providing for aspects of the teachings herein. For example, additional materials, combinations of materials and/or omission of materials may be used to provide for added embodiments that are within the scope of the teachings herein.

In the present application a variety of embodiments are described. It is to be understood that any combination of any of these variables can define an embodiment of the invention. For example, a combination of a particular liner sheet material, with a particular compound, applied in a certain manner might not be expressly stated, but is an embodiment of the invention. Other combinations of articles, components, conditions, and/or methods can also be specifically selected from among variables listed herein to define other embodiments, as would be apparent to those of ordinary skill in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

Therefore, it can be seen that the present invention provides an improved method for repairing in-ground tunnel structures that does not involve installing sheets, panels, and other mechanical supports in the tunnel. Further it can be seen that the present invention discloses a method whereby a first curable resin is applied to the interior wall surfaces of the tunnel and a sheet of composite material, suspended within the tunnel is pressed into the resin on the wall structure of the tunnel. The resins are allowed to cure and harden, thereby sealing the wall surfaces and drainage holes. The resulting composite tunnel structure has high mechanical integrity and is resistant to water leaks. These and other objects, features, and advantages of this invention are evident from the following description and attached figures.

What is claimed:

1. A method for installing a liner in an underground structure, comprising the steps of:
    cleaning a structure to be lined;
    installing a suspension cable longitudinally adjacent a top portion of the structure;
    suspending at least one sheet of liner composite along the suspension cable;
    applying resin to the wall on one side of the structure;
    bedding a portion of said at least one sheet of liner composite into the applied resin;
    applying resin to the wall on the remaining side of the structure; and
    bedding the remainder of said at least one sheet of liner composite into the resin.

2. The method of claim 1, wherein said step of suspending at least one sheet of liner composite along the suspension cable further comprises:
    suspending a plurality of sheets of liner composite in a distributed fashion along the suspension cable.

3. The method of claim 2 further comprising:
    repeating said steps of applying resin and bedding said liner sheet for each of said plurality of liner sheets.

4. The method of claim 2, further comprising:
    removing a portion of said suspension cable adjacent said bedded liner sheet once the top edge of the resin and liner composite becomes self-supporting.

5. The method of claim 1, further comprising:
    removing a portion of said suspension cable adjacent said partially bedded liner sheet once the top edge of the resin and liner composite becomes self-supporting.

6. A method for installing a liner in an underground structure, comprising the steps of:
    cleaning a structure to be lined;
    installing a suspension cable longitudinally adjacent a top portion of the structure;
    suspending at least one sheet of liner composite along the suspension cable;
    applying resin to the wall on one side of the structure;
    bedding a portion of said at least one sheet of liner composite into the applied resin;
    removing a portion of said suspension cable adjacent said partially bedded liner sheet once the top edge of the resin has sufficiently cured such that the partially bedded liner composite becomes self-supporting;
    applying resin to the wall on the remaining side of the structure; and
    bedding the remainder of said at least one sheet of liner composite into the resin.

7. The method of claim 6, wherein said step of suspending at least one sheet of liner composite along the suspension cable further comprises:
    suspending a plurality of sheets of liner composite in a distributed fashion along the suspension cable.

8. The method of claim 7, further comprising:
    repeating said steps of applying resin and bedding said liner sheet for each of said plurality of liner sheets.

* * * * *